(12) United States Patent
Soevik et al.

(10) Patent No.: US 12,441,262 B2
(45) Date of Patent: Oct. 14, 2025

(54) CRASH BOX FOR A BUMPER ARRANGEMENT OF A MOTOR VEHICLE, AND CRASH MANAGEMENT SYSTEM HAVING TWO CRASH BOXES

(71) Applicant: BENTELER AUTOMOBILTECHNIK GMBH, Paderborn (DE)

(72) Inventors: Odd Perry Soevik, Hamar (NO); Bernardo Figueiredo, Oslo (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 352 days.

(21) Appl. No.: 18/174,663

(22) Filed: Feb. 27, 2023

(65) Prior Publication Data
US 2023/0271583 A1 Aug. 31, 2023

(30) Foreign Application Priority Data
Feb. 28, 2022 (DE) ...................... 10 2022 104 669.9

(51) Int. Cl.
*B60R 19/34* (2006.01)
(52) U.S. Cl.
CPC .................................... *B60R 19/34* (2013.01)
(58) Field of Classification Search
CPC ...................................................... B60R 19/34
USPC ................................................. 293/132, 133
See application file for complete search history.

(56) References Cited

U.S. PATENT DOCUMENTS

| 9,102,289 | B2 | 8/2015 | Braunbeck et al. | |
| 2010/0126813 | A1* | 5/2010 | Hayashi | B60R 19/34 188/377 |
| 2013/0119705 | A1* | 5/2013 | Matuschek | B60R 19/34 296/187.03 |
| 2015/0158442 | A1* | 6/2015 | Yun | F16F 7/12 293/132 |
| 2017/0233005 | A1* | 8/2017 | Sawa | B62D 25/00 296/187.03 |
| 2018/0222417 | A1 | 8/2018 | Sano et al. | |
| 2018/0370468 | A1* | 12/2018 | Yokota | F16F 7/00 |
| 2019/0283697 | A1* | 9/2019 | Tashiro | B62D 25/082 |
| 2020/0269787 | A1 | 8/2020 | Vovesny | |
| 2020/0307478 | A1* | 10/2020 | Eklund | B60R 19/34 |
| 2021/0221311 | A1 | 7/2021 | Weige | |
| 2022/0379964 | A1* | 12/2022 | Tashiro | B62D 21/152 |

(Continued)

FOREIGN PATENT DOCUMENTS

| CN | 107709131 A | 2/2018 |
| CN | 111605504 A | 9/2020 |

(Continued)

*Primary Examiner* — Gregory A Blankenship
(74) *Attorney, Agent, or Firm* — Norman B. Thot

(57) ABSTRACT

The invention relates to a crash box (1) for a bumper arrangement (2) of a motor vehicle, having at least two closed hollow chambers (5, 6, 7) which are formed over their entire longitudinal extent from a bumper-side end (3) as far as a vehicle-side end (4) and which are in each case separated from one another by a partition (10, 11) running between an outer wall (8) and an inner wall (9) of the crash box (1). The invention is distinguished in that the partition (10, 11) is provided with a slot (13) at its vehicle-side end (4) in its half (12) directed toward the inner wall (9) of the crash box (1).

20 Claims, 3 Drawing Sheets

(56) References Cited

U.S. PATENT DOCUMENTS

| | | | |
|---|---|---|---|
| 2023/0271583 A1* | 8/2023 | Soevik | B60R 19/34 |
| | | | 293/133 |
| 2023/0373419 A1* | 11/2023 | Tatarinov | B60R 19/18 |
| 2024/0190371 A1* | 6/2024 | Rabl | B60R 19/34 |

FOREIGN PATENT DOCUMENTS

| | | |
|---|---|---|
| CN | 112469598 A | 3/2021 |
| DE | 195 17 918 A1 | 11/1996 |
| DE | 10 2011 119 092 A1 | 5/2013 |
| WO | 2016/148635 A1 | 9/2016 |
| WO | 2017/022158 A1 | 2/2017 |
| WO | WO 2019/025163 A1 | 2/2019 |

\* cited by examiner

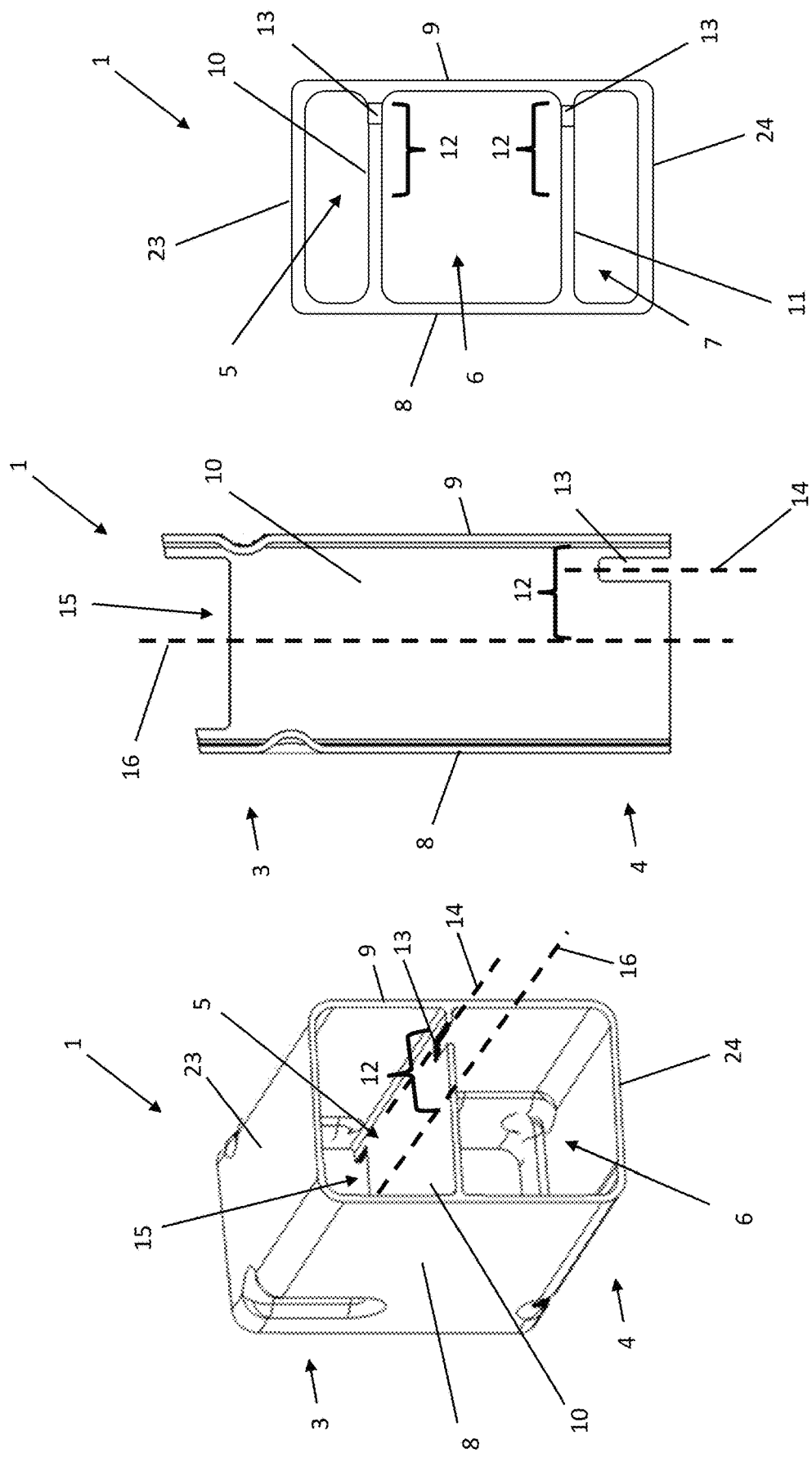

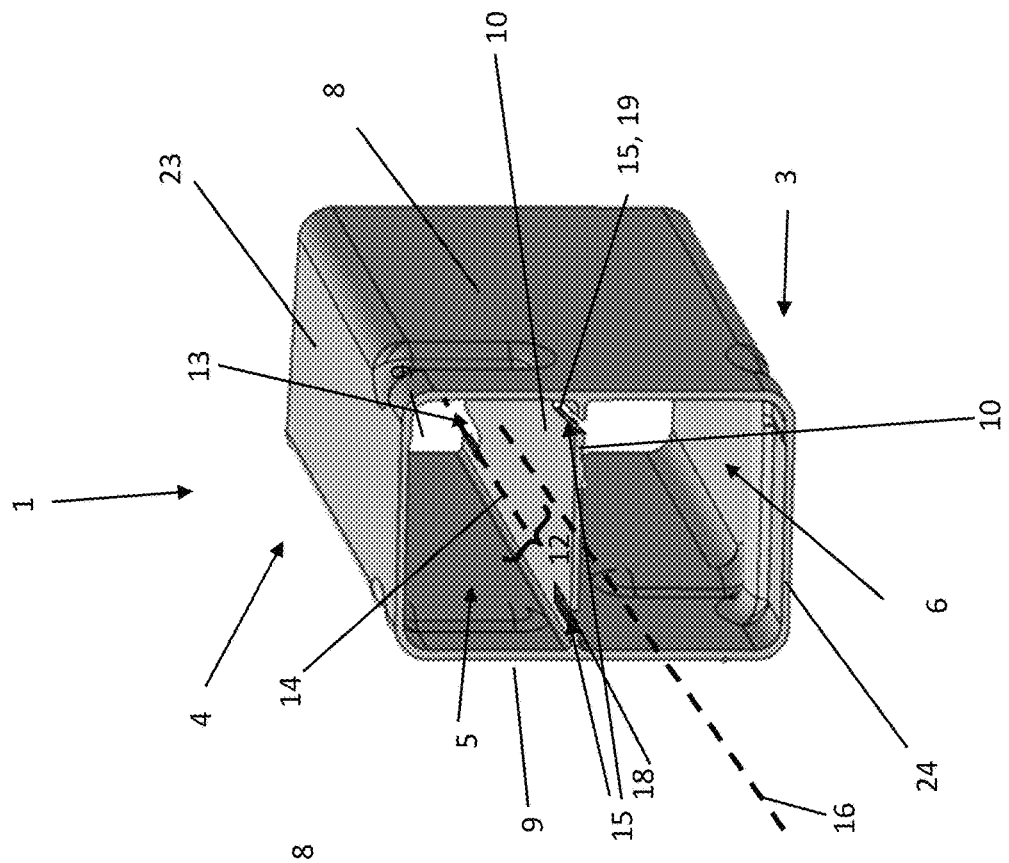
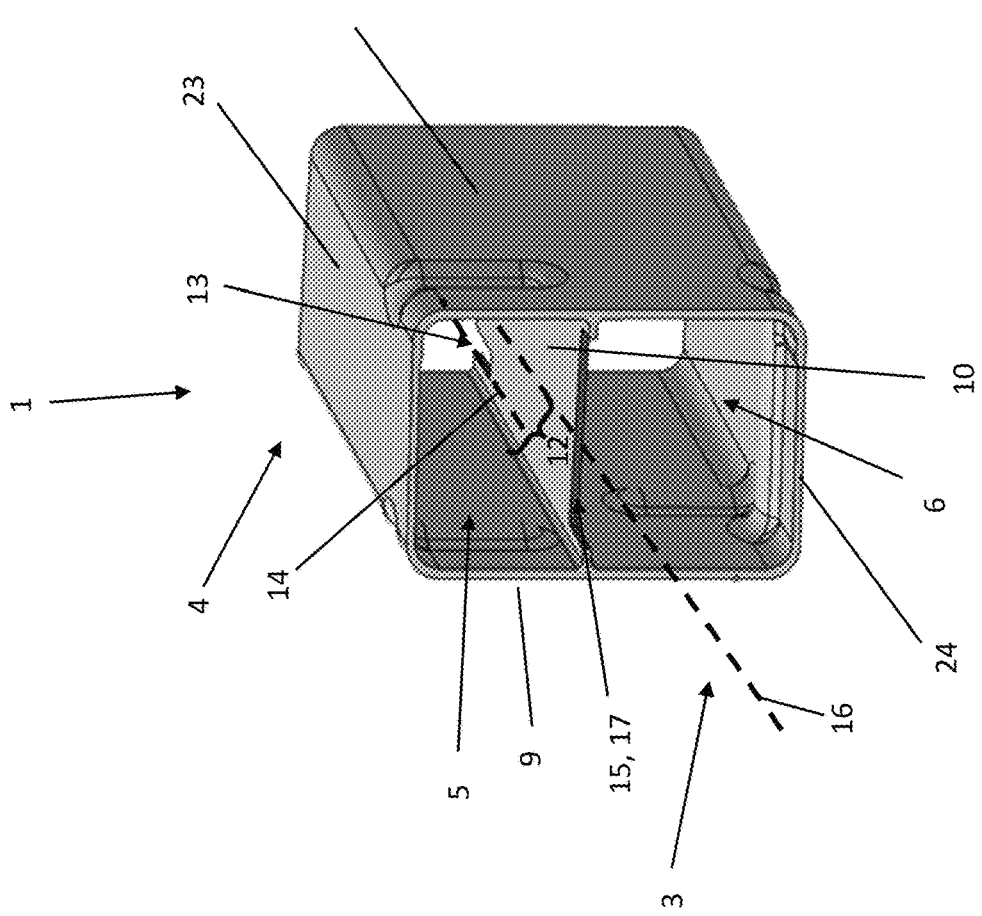
Fig. 4
Fig. 5

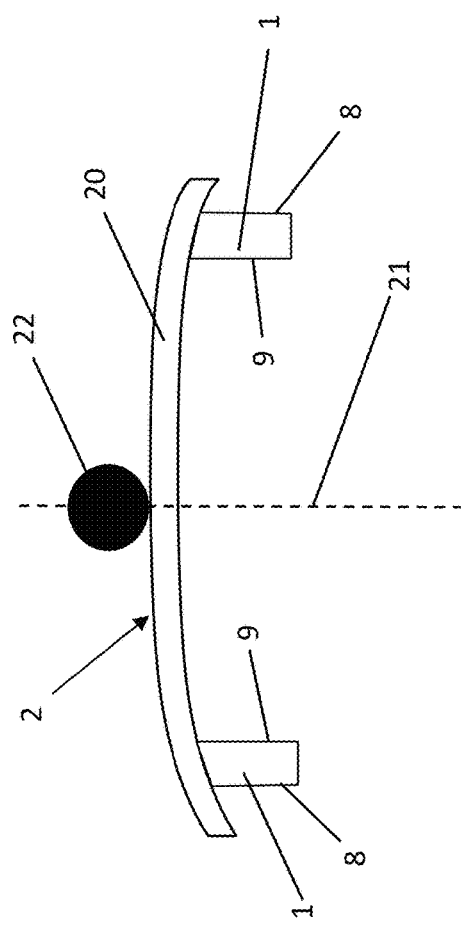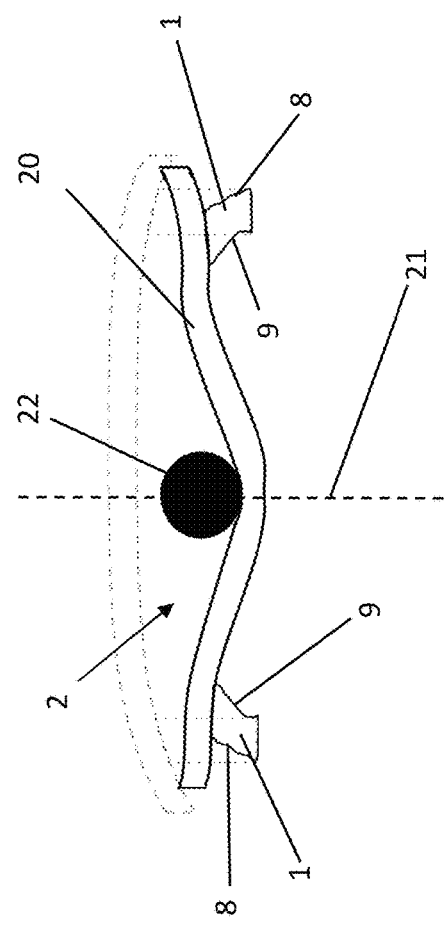

CRASH BOX FOR A BUMPER ARRANGEMENT OF A MOTOR VEHICLE, AND CRASH MANAGEMENT SYSTEM HAVING TWO CRASH BOXES

The invention relates to a crash box for a bumper arrangement of a motor vehicle, and to a crash management system having two such crash boxes.

Crash boxes and crash management systems are generally used in all motor vehicles and have the task, in the event of a crash, of absorbing the energy introduced via the bumper arrangement or a bumper beam in the crash boxes by corresponding folding or deformation of the crash boxes and of transmitting excess energy into the frame or the longitudinal members of the motor vehicle in order thereby to conduct the energy introduced into the motor vehicle by the crash around the passenger cell and to minimize damage to the passenger cell and therefore to reduce the risk of injury to the passengers.

However, in the case of motor vehicles driven purely electrically, a large constructional block consisting of internal combustion engine and transmission is no longer arranged in front of the passenger cell, as is the case in conventional motor vehicles which are driven by means of an internal combustion engine. Therefore, in the case of electrically driven motor vehicles, there is a tendency for there to be a relatively large empty space behind the crash management system and between the longitudinal members, in which the obstacle may penetrate in the event of a crash, whereas, in the case of a motor vehicle having an internal combustion engine, said space also contributes to conducting away the energy introduced into the motor vehicle around the passenger cell.

The crash management system of an electrically driven motor vehicle therefore has to be suitable, together with the front end structure and/or rear end structure, to absorb energy up to a much higher level of penetration during an in particular central crash by means of specific deformation and to conduct the energy around the passenger cell, than in the case of a conventional motor vehicle having an internal combustion engine. This imposes very high demands on the welded joints within the crash management system. Since electric vehicles, because of the batteries necessary for the electric drive, are generally significantly heavier than conventional motor vehicles having an internal combustion engine, the demands imposed on the welded joints within the crash management system are also very exacting. In order to produce the electrically driven vehicles to be as lightweight as possible and to reduce the emissions in a global life cycle perspective, it is therefore frequently expedient to use lightweight aluminum crash management systems as an alternative to steel.

In the typical tests which a crash management system has to pass so that the vehicle passes the insurance tests, the folding of the crash boxes for the specific absorption of energy has to comply with corresponding specifications. It is therefore important to be able to coordinate the force level of the maximum peaks during the folding of the crash boxes. However, in addition to the coordination of the profile geometry of the wall thicknesses to the use of trigger influences and the position, quantity and depth thereof, further measures have to be taken to optimize the folding and energy absorption and energy transmission of the crash boxes.

US20200269787 A1, DE 195 17 918 A1 and U.S. Pat. No. 9,102,289 B2 disclose crash boxes according to the preamble of patent claim 1, with which various crash management systems are realized. However, there is a further need for improvement, in particular for electrically driven motor vehicles.

It is therefore the object of the invention to provide a crash box for a bumper arrangement of a motor vehicle, in which the folding in the event of a crash and the energy transmission into the motor vehicle frame are further optimized and improved. Furthermore, it is an object of the invention to provide a corresponding crash management system having such crash boxes.

In respect of the crash box, this object is achieved by a crash box having all of the features of patent claim 1. In respect of the crash management system, this object is achieved by a crash management system having all of the features of patent claim 10. Advantageous configurations of the invention are found in the dependent claims.

The crash box according to the invention for a bumper arrangement of a motor vehicle has at least two closed hollow chambers which are formed over their entire longitudinal extent from a bumper-side end as far as a vehicle-side end and which are in each case separated from one another by a partition running between an outer wall and an inner wall of the crash box. According to the invention, provision is now made that the respective partition is provided with a slot at its vehicle-side end in its half directed toward the inner wall of the crash box.

By means of the use of such slots in the partitions of the hollow chambers, the inward bending of the crash box in the event of a crash against a narrow obstacle, such as a pole or tree trunk, is triggered in a length portion between the crash boxes, in particular in a central pole crash. The inward bending of the crash box functions here substantially as a hinge and contributes to reducing the tensile stresses at the outer weld seams between the crash boxes and the longitudinal members or the connection elements to the longitudinal members and therefore to maintaining their integrity up to a higher degree of penetration of the obstacle. Said slots within the partitions of the hollow chambers of the crash box make it possible for the crash boxes to bend inward in the event of a crash and to contribute to a positive obstacle impact power in which the crash management system is capable of absorbing high energy levels, with the weld seams within the crash management systems remaining intact up to a high level of penetration of the obstacle.

According to a first advantageous refinement of the invention, provision is made that the partition is also provided with a slot at its bumper-side end in its half directed toward the inner wall of the crash box. Such a slot at the bumper-side end of the inner wall also contributes to a particular extent to the desired folding of the crash box in the event of a crash and to the energy absorption and the transmission of energy into the vehicle longitudinal member, and therefore the crash box power or the crash management system is also optimized by means of this refinement of the invention. A corresponding folding of the crash box in the event of a crash is therefore not only introduced on the vehicle side but also on the bumper side, and therefore particularly good energy absorption within the crash box is ensured by the deformation thereof in the event of a crash, as is effective transmission of the excess energy into the vehicle longitudinal members.

According to a particularly advantageous refinement of the invention, it has proven to be particularly advantageous that the length of the slot is at least 8 mm and at maximum 35%, preferably 10% to 25%, of the length of the crash box. This slot geometry ensures particularly good energy absorption within the crash box during the crash and corresponding transmission of the excess crash energy into the vehicle longitudinal members around the passenger cell.

The refinement of the invention, that the width of the slot is at maximum four times the wall thickness of the inner wall of the crash box and is preferably up to 2 mm, aims in the same direction. This geometry also leads to particularly effective action of deformation and energy absorption within the crash box during the crash and to a particularly good transmission of the excess energy within the vehicle longitudinal members around the passenger cell, and therefore this refinement of the invention also means that the vehicle occupants within the passenger cell are particularly well protected in the event of a crash.

According to a particularly advantageous refinement of the invention, provision can also be made that the slot is formed by edges of the partition that are bent away from one another. This means that the partition is cut into, with one part of the partition being bent upward in the region of said incision, while the other part of the partition is bent downward in the region of the incision. This also gives rise to a corresponding slot which, however, can change during the deformation or during the bending in of the crash box in such a manner that longitudinal edges come to lie one above another or overlap in the region of the incision of the partition.

In a particularly advantageous refinement of the invention, provision is made that the distance of the central longitudinal axis of the slot from the inner wall of the crash box is at maximum one third of the width of the crash box, preferably at maximum 20 mm. This slot geometry within the partition of the crash box also achieves particularly efficient folding of the crash box in the event of a crash since it is desirable for the folding to be introduced in the region of the inner wall of the crash box. This is achieved in a particularly advantageous manner by means of this refinement of the invention.

Furthermore, provision can be made that the slot begins at a maximum of 15 mm, preferably at a maximum of 100 mm, from the vehicle-side end of the crash box and extends in the direction of the bumper-side end and is preferably in the form of an elongated hole. The advantages according to the invention are also achieved by such slot geometries.

In a further advantageous refinement of the invention, the partition is provided with at least one cutout element at its bumper-side end. By means of such cutout elements, the force level of the maximum peaks during the folding of the crash boxes can be particularly well coordinated, as a result of which, however, the safety of the passengers within the passenger cell can be increased. Such cutout elements within the partitions of the hollow chambers of the crash box help during the folding in of the crash box and therefore already considerably reduce the first force peaks at the beginning of a crash. In addition, this refinement permits an additional construction space for the arrangement of a tow hook mounting in the region of the partition, the tow hook mounting being able to be fastened, e.g. as a threaded element, to a bumper beam.

It has proven particularly advantageous here that the at least one cutout element is formed as precisely one cutout which is spaced apart uniformly in the direction of the outer and inner wall from a central longitudinal axis of the partition. Alternatively, provision can also be made that a plurality of cutout elements are provided which are spaced apart from a central longitudinal axis of the partition, preferably spaced apart uniformly, the cutouts particularly preferably being at the same distance in pairs from the central longitudinal axis of the partition. In both alternatives, it is possible to achieve particularly good folding-in scenarios of the crash box and a reduction of the first force peaks in the event of a crash.

In order to achieve a particularly stable connection between the crash box and the motor vehicle, a connecting flange is welded on at the vehicle-side end of the crash box. For this purpose, the crash box advantageously has a top wall and a bottom wall which connect the outer wall and the inner wall to one another, said four walls forming an outer circumference of the crash box, and the crash box being welded over its entire outer circumference, i.e. all the way around, to the connecting flange.

The refinement of the invention, that the connecting flange is connected, preferably releasably connected, particularly preferably screwed, to a vehicle longitudinal member or a longitudinal member flange plate, aims in the same direction. The releasable connections are particularly advantageous in order to exchange crash boxes damaged in the event of a crash for new ones in a simple manner.

The crash management system according to the invention has at least one, but preferably two previously described crash boxes, which are connected to one another via a bumper beam. The bumper beam is frequently also referred to as a bumper or crossmember and used here as a synonym.

It has proven to be particularly advantageous here that the two crash boxes of the crash management system are arranged on the bumper beam mirror-symmetrically with respect to a vehicle central longitudinal axis.

Further aims, advantages, features and possible applications of the present invention will become apparent from the following description of exemplary embodiments with reference to the drawings. Here, all the features that are described and/or depicted pictorially separately or in any meaningful combination form the subject matter of the present invention, regardless of how they are combined in the claims or the back-references of the latter.

In the Drawings:

FIG. 1: shows a first exemplary embodiment of a crash box according to the invention in a perspective view of the bumper-side end, FIG. 2: shows a longitudinal sectional illustration of the crash box from FIG. 1 above the partition of said crash box, FIG. 3: shows a cross-sectional illustration of a further exemplary embodiment of a crash box according to the invention with three hollow chambers and two partitions, FIG. 4: shows a perspective view of the bumper-side end of the crash box of FIG. 1, FIG. 5: shows a perspective view of the bumper-side end of an exemplary embodiment of a further crash box according to the invention, FIG. 6: shows a crash management system according to the invention directly before the impact of an obstacle, in a view from above, and FIG. 7: shows the crash management system of FIG. 6 after an impact against an obstacle, in a view from above.

FIG. 1 illustrates a first exemplary embodiment of a crash box 1 according to the invention.

The crash box 1 has two hollow chambers 5 and 6 which are separated from one another by a partition 10. The partition runs here from an outer wall 8 to an inner wall 9 of the crash box 1. The outer wall 8 and the inner wall 9 are connected to one another via a top wall 23 and a bottom wall 24, said four walls 8, 9, 23 and 24 forming an outer circumference of the crash box 1. The partition 10 has a slot 13 at its vehicle-side end 4, the slot being located within that half 12 of the partition 10 which faces the inner wall 9. At the bumper-side end 3 of the crash box 1, the partition 10 has a recess 15 which is formed virtually over the entire transverse extent of the crash box 1. This can be seen in particular in the longitudinal sectional illustration of FIG. 2 of the exemplary embodiment of the crash box from FIG. 1. In addition, the crash box has stamped formations as predetermined deformation points at the bumper-side end 3 in the region of the four longitudinal edges, which stamped formations serve for the defined, initial forming of folding of the crash box, for example in small overlap and ROAR bumper crash scenarios.

The illustration of FIG. 2 also particularly readily clarifies the geometry of the partition 10, the geometry of which is responsible for the particularly effective folding of the crash box in the event of a crash. It can clearly be seen in this illustration that the partition 10 has a greater extent in its longitudinal extent in the region of the inner wall 9 of the crash box 1 than in the region of the outer wall 8 of the crash box. To this extent, the cutout element 15 at the bumper-side end 3 of the crash box 1 is just as little mirror-symmetrical with respect to a central longitudinal axis 16 of the crash box 1 as the partition 10 itself. The mirror symmetry, which is not present, of the partition 10 with respect to the central longitudinal axis 16 of the crash box 1 is also shown once again by the slot 13 at the vehicle-side end 4 of the crash box 1, the slot being arranged in that half 12 of the partition 10 which is directed toward the inner wall 9. The slot 13 here has a central longitudinal axis 14 which runs parallel to the central longitudinal axis 16 of the crash box 1 or the partition 10. The slot 13 here is arranged in the vicinity of the inner wall 9 of the crash box 1, with the central longitudinal axis 14 of the slot 13 being spaced apart from the inner wall 9 at a maximum of one third of the width of the crash box, preferably a maximum of 10 mm.

FIG. 3 now illustrates the cross section of a further exemplary embodiment of a crash box 1 according to the invention. In contrast to the previously described exemplary embodiment, this crash box 1 now has three hollow chambers 5, 6 and 7, the hollow chambers 5 and 6 being separated from one another by a partition 10, and the hollow chambers 6 and 7 being separated from one another by a partition 11. The partitions 10 and 11 of this exemplary embodiment correspond in their geometry to the partition 10 of the exemplary embodiment of FIGS. 1 and 2, and therefore the longitudinal sectional illustration of FIG. 2 also describes the partitions 10 and 11 of FIG. 3. It can clearly be seen in the illustration of FIG. 3 that the slots 13 of the partitions 10 and 11 are again clearly arranged in the vicinity of the inner wall 9 of the crash box 1, in that half 12 of the partitions 10 and 11 which faces the inner wall 9.

FIG. 4 now illustrates a perspective view of the crash box from FIG. 1 at its bumper-side end 3. In this illustration, the cutout element 15 in the form of cutout 17 can once again be seen in its entire extent at the bumper-side end 3 of the crash box 1.

FIG. 5 shows a further exemplary embodiment of a crash box according to the invention in a perspective illustration of the bumper-side end of the crash box 1. In contrast to the exemplary embodiment of FIGS. 1, 2 and 4, this exemplary embodiment has a partition 10, with two cutout elements 15 in the form of cutouts 18 and 19 now being arranged at its bumper-side end 3 of the crash box 1. Said cutouts 18 and 19 are respectively located away from a central longitudinal axis 16 of the partition 10 or of the crash box 1 in the region of the outer wall 8 and the inner wall 9 of the crash box 1. At its vehicle-side end 4 of the crash box 1, the partition 10 of this exemplary embodiment is formed in accordance with the exemplary embodiment of FIGS. 1, 2 and 4.

In all of the previously described exemplary embodiments, a connecting flange is welded on at the vehicle-side end 4 of the crash box in order to connect the crash box to a vehicle longitudinal member, not illustrated in the figures, or a longitudinal member flange plate, not illustrated in the figures.

The top wall 23 and the bottom wall 24 together with the outer wall 8 and the inner wall 9 form an outer circumference of the crash box 1, the crash box 1 being welded over its entire outer circumference to the connecting flange.

Said connecting flange is connected to a vehicle longitudinal member or longitudinal member flange plate. The connection here is configured releasably, for example by means of a screw connection, in order to exchange crash boxes 1 damaged in the event of a crash for new ones in a simple manner.

FIG. 6 now illustrates a crash management system which connects two of the previously described crash boxes 1 according to the invention to one another by a bumper beam 20. The crash boxes 1 each have an inner wall 9 and an outer wall 8 and are formed mirror-symmetrically with respect to a central longitudinal axis 21 of the crash management system. FIG. 6 shows the crash management system directly before an impact against an obstacle 22. The impact of the obstacle 22 takes place centrally in the region of the central longitudinal axis 21 of the crash management system. A center pole test is also referred to.

FIG. 7 now illustrates the crash management system from FIG. 6 after penetration of the obstacle 22 into the crash management system, the dashed lines illustrating the crash management system prior to the impact, i.e. in accordance with FIG. 6. As is apparent from the illustration of FIG. 7, the bumper beam 20 has been pressed in centrally by the obstacle 22 and has deformed the crash boxes 1 correspondingly inward in the region of the respective inner wall 9, with the outer walls 8 of the crash boxes 1 also being correspondingly deformed. The configuration according to the invention of the crash boxes 1 achieves particularly good deformation or particularly good folding in of the crash boxes, and therefore the risk of failure of the welded joints (or alternative screw connections) between crash box and vehicle longitudinal member is reduced and particularly effective energy absorption takes place by means of the crash boxes 1 and excess energy is transmitted into the vehicle longitudinal members around the passenger cell. However, the effect according to the invention can also be achieved in the event of impact events which are not central, but rather are limited locally between the crash boxes.

LIST OF REFERENCE SIGNS

1 Crash box
2 Bumper arrangement
3 Bumper-side end
4 Vehicle-side end
5 Hollow chamber
6 Hollow chamber
7 Hollow chamber
8 Outer wall
9 Inner wall
10 Partition
11 Partition
12 Half
13 Slot
14 Central longitudinal axis
15 Cutout element
16 Central longitudinal axis 17 Cutout
18 Cutout
19 Cutout
20 Bumper beam
21 Vehicle longitudinal axis
22 Obstacle
23 Top wall
24 Bottom wall

The invention claimed is:

1. A crash box for a bumper arrangement of a motor vehicle, the crash box comprising
   at least two closed hollow chambers each of which extend over an entire longitudinal extent from a bumper-side end to a vehicle-side end and which are in each case separated from one another by a partition which is arranged to extend between an outer wall and an inner wall of the crash box,
   wherein the partition comprises a first slot at the vehicle-side end in a half which is directed toward the inner wall of the crash box.

2. The crash box as recited in claim 1, wherein the partition further comprises a second slot at the bumper-side end in a half which is directed toward the inner wall of the crash box.

3. The crash box as recited in claim 2, wherein a length of the first slot and of the second slot is a minimum of at least 8 mm and a maximum of 35% of a length of the crash box.

4. The crash box as recited in claim 2, wherein,
   the inner wall has a wall thickness, and
   a maximum width of the first slot and of the second slot is four times the wall thickness of the inner wall of the crash box.

5. The crash box as recited in claim 2, wherein,
   the first slot is formed by first edges of the partition being bent away from one another, and
   the second slot is formed by second edges of the partition being bent away from one another.

6. The crash box as recited in claim 1, wherein,
   the first slot has a central longitudinal axis, and
   a distance of the central longitudinal axis of the first slot from the inner wall of the crash box is a maximum of one third of a width of the crash box.

7. The crash box as recited in claim 1, wherein the first slot begins at a maximum of 15 mm, preferably at a maximum of 100 mm, from the vehicle-side end of the crash box and extends in a direction of the bumper-side end.

8. The crash box as recited in claim 1, wherein a connecting flange is welded on the vehicle-side end of the crash box.

9. The crash box as claimed in claim 8, wherein the crash box further comprises:
   a top wall; and
   a bottom wall,
   wherein,
   the top wall and the bottom wall are each arranged to connect the outer wall and the inner wall to one another, the top wall, the bottom wall, the outer wall, and the inner wall together forming an outer circumference of the crash box, and
   the crash box is welded over the entire outer circumference to the connecting flange.

10. The crash box as claimed in claim 8, wherein the connecting flange is connected to a vehicle longitudinal member or to a longitudinal member flange plate.

11. A crash management system comprising:
    a first crash box;
    a second crash box; and
    a bumper beam via which the first crash box is connected to the second crash box,
    wherein,
    at least one of the first crash box and the second crash box is the crash box as recited in claim 1.

12. The crash management system as recited in claim 11, wherein at least one of,
    the first crash box comprises at least one cutout element which is arranged at the bumper-side end, and
    the second crash box comprises at least one cutout element which is arranged at the bumper-side end.

13. The crash management system as claimed in claim 12, wherein the at least one cutout element is provided as precisely one cutout.

14. The crash management system as claimed in claim 12, wherein the at least one cutout element is provided as a plurality of cutouts.

15. The crash management system as claimed in claim 14, wherein,
    the partition has a central longitudinal axis,
    the plurality of cutouts are arranged as at least one pair of cutouts, and
    each pair of the at least one pair of cutouts are arranged uniformly spaced apart from the central longitudinal axis of the partition.

16. The crash management system as claimed in claim 13, wherein,
    the partition has a central longitudinal axis, and
    the precisely one cutout is arranged in a direction of the outer wall and the inner wall uniformly spaced apart from the central longitudinal axis of the partition.

17. The crash box as claimed in claim 8, wherein the connecting flange is releasably connected via a screw to a vehicle longitudinal member or to a longitudinal member flange plate.

18. The crash box as recited in claim 7, wherein the first slot begins at a maximum of 100 mm from the vehicle-side end of the crash box and extends in the direction of the bumper-side end in a form of an elongated hole.

19. The crash box as recited in claim 4, wherein the maximum width of the first slot and of the second slot is 2 mm.

20. The crash box as recited in claim 2, wherein a length of the first slot and of the second slot is 10% to 25% of a length of the crash box.

* * * * *